CARVING KNIFE FOR A ONE-ARMED PERSON
Filed Aug. 22, 1967
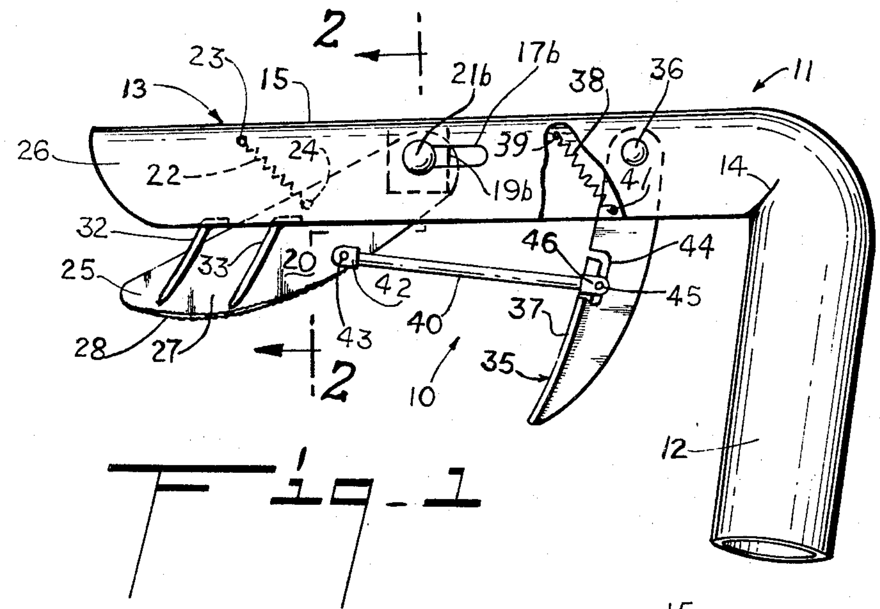
Fig. 1
Fig. 2
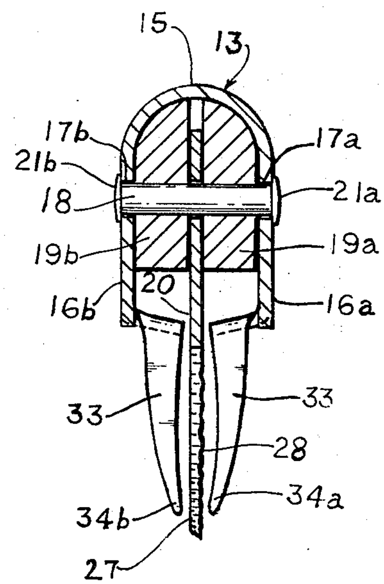
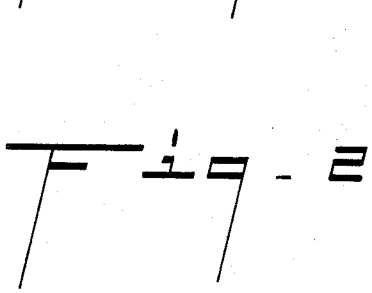
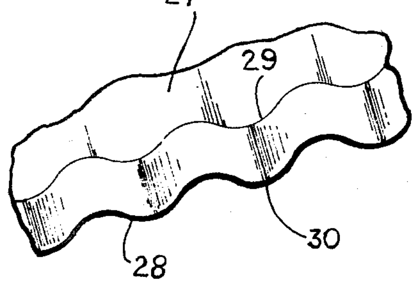
Fig. 3
CLAUDE CANION
INVENTOR
BY Wm. E. Ford
ATTORNEY

United States Patent Office 3,405,445
Patented Oct. 15, 1968

3,405,445

CARVING KNIFE FOR A ONE-ARMED PERSON

Claude Canion, 91 Tidwell Road, Houston, Tex. 77022

Filed Aug. 22, 1967, Ser. No. 662,417
10 Claims. (Cl. 30—148)

ABSTRACT OF THE DISCLOSURE

The invention relates to a knife with frame providing a handle and a support member at substantially right angles thereto. A trigger is pivotally supported adjacent the handle, and the support pivotally, slidably mounts a knife forwardly of the handle. A connection arm has its respective ends pivotally connected to trigger and knife. Fork prongs extend from the support downwardly on each side of the knife. The trigger pull is yieldably resisted by springs anchored upwardly in the support and downwardly respectively to knife and trigger. Successively the trigger can be pulled rearwardly, released, and pulled again.

This invention relates to a knife for a one-armed man which is adapted to be held to spike the food against displacement and manipulated by a finger or fingers in a trigger action to cut the food.

It is a primary object of the invention to provide a knife, as for a one-armed man, which may be held to spike the food against displacement with a trigger finger, or a trigger finger and another finger or fingers being free to manipulate a trigger which in turn manipulates a cutting blade to cut food, particularly steaks and the like.

It is also an object of the invention to provide a knife of this class which is positive in its operation, and which provides both food holding and cutting means disposed for positive operation with one hand effectively to selectively cut food, as steaks and the like.

It is still a further object of the invention to provide a knife of this class which may be easily cleaned, and which has its parts mounted to be retracted when not in use; the knife being easily stored or carried.

It is still a further object of this invention to provide a knife of this class with specially designed serrations or cutting teeth, and with parts that may be spring retracted into the barrel of the frame when not being used.

Other and further objects will be apparent when the specification hereinbelow is considered in connection with the drawings, in which:

FIG. 1 is a side elevational view of an embodiment of the invention assembled to be employed selectively in cutting;

FIG. 2 is a transverse sectional elevation taken along line 2—2 of FIG. 1; and

FIG. 3 is a fragmentary isometric view of part of the cutting edge of a blade, as employed in the embodiment shown in FIGS. 1 and 2.

Referring now in detail to the drawings in which like reference numerals are applied to like elements in the various views, a knife 10 is shown in FIG. 1 which includes a pistol-shaped frame 11, which includes a tubular handle 12 and a barrel 13 extending substantially normal therefrom.

The whole frame, including the food holding teeth, prongs, or spikes, to be hereinbelow described, may be blanked out of a metal sheet, as stainless steel, for instance, and then the handle 12 rounded into tubular form and closed forwardly along an upstanding brazed or welded seam, not shown. The barrel 13, bent at the joint 14, can be formed with an arcuate top surface 15 and substantially vertically downwardly extending side walls **16*a*, 16*b***, as best shown in FIG. 2.

Opposed, horizontally extending slots **17*a*, 17*b* are provided in the respective barrel side walls 16*a*, 16*b*, to restrain the movement of a blade axle 18 therein, spacers 19*a*, 19*b* receiving the axle 18 therethrough and extending on either side of a centered blade 20, through which the axle 18 also passes, to space the blade 20 from the inner surfaces of the respective side walls 16*a*, 16*b*. The axle 18 has retaining heads or flanges 21*a*, 21*b*, as the outer ends thereof, to bear slidably against the outer surfaces of the side walls 16*a*, 16*b* to restrain the axle 18** against axial translation.

The blade 20 extends downwardly and forwardly from its axle mounted upper end, and a spring 22, with upper end anchored, as upon a pin 23 across the upper part of the barrel 13, has its lower end connected at 24 to the upper, central part of the blade 20. The blade extends, in its forward position, as shown in FIG. 1, to a position with its tip 25 slightly over-extended by the upwardly arched forward end 26 of the barrel 13.

The blade 20 has a serrated lower or cutting under side 27 which extends rearwardly from its tip 25, the serrations on the cutting edge 28 being arcuate in form, while concentric arcuate surfaces 29 are formed along the opposite side or face of the blade 20, with the blade edge surface being ground between the apices of the serrations, thus to form a series of tapered teeth 30 which initially establish a sharp cutting edge contact with the food to be cut, as, for instance, various beefsteaks.

A forward and a rear tooth, spike or prong 32, 33 are provided to extend downwardly and forwardly from the barrel side walls **16*a*, 16*b* on each side of the barrel, the points 34*a*, 34*b* of the prongs extending slightly inwardly toward the blade 20, and terminating slightly above the cutting arc of the serrations or blade teeth 30. As best indicated in FIG. 2, the prongs or spikes are blanked out of the same stainless steel stock as the frame 11, and are bent first inwardly and then forwardly and downwardly to take the positions relative to the blade 20**, as indicated in FIG. 1.

Rearwardly of the blade 20, a trigger 35 has its upper portion pivotally mounted upon an axle or rivet 36 which extends across the barrel 13, from side wall to side wall, in which the ends of the rivet are fixed or journalled. The trigger 35 extends downwardly below the barrel and its lower part has a transversely extending part to provide a finger rest or grasp 37. A spring 38, having its upper, forward end fixed to a pin 39, which extends across the upper part of the barrel 13, between the blade 20 forwardly and the trigger pivot 36 rearwardly, has its lower, rearward end connected into the upper, forward part of the trigger 35, as indicated at 41 in FIG. 1, and in this manner the trigger 35 is normally drawn forwardly so that the trigger pull is opposed by the balancing force of the spring 38.

A linkage 40 connects the trigger 35 and the blade 20, such linkage 40 having forwardly a bifurcated end 42, to extend on either side of the rearward portion of the blade at a point between the forward, lower, cutting portion, and the upper, rearward, pivotally mounted portion, a pivot pin 43 extending through the blade 20 and the forward end bifurcations to effect the pivotal connection between linkage 40 and blade 20.

A J-slot 44 is provided in the forward part of the trigger 35 to extend first inwardly and then downwardly to receive a pivot pin 45 therethrough which extends through the bifurcations of the linkage rear end 46, the bifurcated linkage end 46 thus completing the operative connection effectuated by the linkage 40 between blade and trigger.

In operation, the knife is manipulated to engage the prong points **34*a*, 34*b* in food, as steak to be cut, such engagement being effected while the trigger is left, as spring urged upwardly, so that the blade 20 does not interfere with the engagement of the prongs. Then the trigger 35 is engaged by at least the trigger or index finger, and in cases or often, at least the second or middle finger may be additionally applied to the trigger grasp 37. Then with the steak, as the work, held by the prongs, the rearward finger pull on the trigger draws the blade 20 rearwardly and downwardly so that the cutting edge 28 first cuts into the mean and is followed by the whole of the tapered teeth 30 as the finger pull on the trigger is applied rearwardly; the blade 20 may thus be moved arcuately downwardly into the meat and also rearwardly, as the axle 18 slides rearwardly in the slots 17***a*, 17*b*.

Upon release or slackening of the finger contact on the trigger, the blade is spring-urged forwardly, while the pistol is manipulated slightly rearwardly without necessarily disengaging the prongs, so another rearward pull can be exerted on the trigger, whereby to move the blade 20 against and into the steak to deepen the cut made by the preceding stroke. This may be repeated until the knife must be manipulated to disengage the prongs 32, 33 and re-engage them further rearwardly in the meat, and then the cutting by blade manipulation may be resumed, as to continue a cut in length.

As constructed the knife 10 provides that the parts may be retracted at least in part into the barrel 13, when the knife is not in use. For instance, if the linkage 40 is disconnected from the trigger 35, the forward spring 22 can draw the blade 20 and the linkage 40 forwardly and upwardly, as shown in FIG. 1, and thus these members can be disposed, at least with the whole blade 20 in the barrel.

Also, with the rear spring 38 provided for the trigger, after the linkage 40 is disposed, the trigger 35 will be drawn further into the barrel 13, on top of the linkage. Also, in this regard, the spring 38 urges all of the parts into compact storage positions so that the knife, when not in use, occupies reduced space, and may be carried in the clothing without visible protrusion.

An important point in considering the apparatus comprising this invention is the ease and accessibility of all of its parts to be cleaned. And noticeably, since the tubular handle 12 has its lower end open, and communicates with the barrel at its junction therewith, while the barrel is also open, the whole frame of the knife may be easily washed and cleaned. Also, all parts, pivot members, and bearing surfaces are easily accessible for cleaning.

There is thus provided a knife which is of assured effectiveness in operation, since the food or work can be held by members or elements of the knife, as a tool, while the blade, and members associated therewith, comprise the other part of the tool which can be manipulated to perform positive cutting operations on the food to be cut.

The invention admits of a number of variations, for instance, only one spring may be provided, preferably the rear spring 38, and the parts will nevertheless be urged folded, when not in use.

Also, the arrangement and number of teeth 32, 33 may be varied. Also, the J-slot may be omitted from the trigger, or one of the springs omitted, as aforesaid, or both springs may be omitted and the knife can still be operated. In effect, the invention is not limited to the structures and modifications of the embodiments shown, but other forms are considered as well as such may fall within the broad spirit of the invention and within the broad scope of interpretation claimed for and merited by the appended claims.

What is claimed is:

1. A knife for a one-armed man comprising a pistol shaped frame including a tubular handle and a barrel providing an underside opening, a trigger with upper end pivotally mounted on axle across said barrel, and extending downwardly through said slot, a blade with upper, mounting part rearwardly on an axle slidable in horizontally extending, aligned slots through opposed side walls of said barrel and with lower, cutting part forwardly and having serrated teeth on the forward underside thereof, a spacer about said axle on each side between side blade and the inner surface of the adjacent barrel side wall, a pair of longitudinally spaced apart prongs forwardly of said slots and on each side extending forwardly and downwardly from the barrel and to some lesser downward extent than the arc of blade cutting action, and a linkage pivotally connected forwardly to the rear central under part of the knife and rearwardly to the forward central part of said trigger, whereby said knife may be held and said trigger operated to cut with one hand as said prongs are disposed engaging the food against displacement as it is cut.

2. A knife as claimed in claim 1 which additionally includes a spring with forward end connected within, and upwardly to the underside of the forward, upper end of said barrel, and with the rearward end connected to the upper central part of said blade.

3. A knife as claimed in claim 1 which additionally has a spring with forward end within said barrel and connected upwardly thereto, and with rearward end connected to the forward part of said trigger between the trigger axle and said linkage.

4. A knife as claimed in claim 1 in which said linkage rear pivot operates within a J-slot in said trigger whereby said linkage may be disengaged from said trigger, so that blade, linkage and trigger may be folded within said barrel when knife is not in use.

5. A knife as claimed in claim 1, in which the linkage connections comprise bifurcations with pivot pins thereacross whereby said pivotal connections are made respectively to blade and trigger.

6. A knife as claimed in claim 1 which additionally includes a spring with forward end connected within, and upwardly to the underside of the forward, upper end of said barrel, and with the rearward end connected to the upper central part of said blade, and which also provides a J-slot in said trigger in which said linkage rear pivot operates, whereby said linkage may be disengaged from said trigger so that said spring may draw said blade and linkage into said barrel, and whereas said trigger may be folded into said barrel thereafter, when said knife is not in use.

7. A knife as claimed in claim 1 which additionally includes a spring with forward end connected within, and upwardly to the underside of the forward, upper end of said barrel, and with the rearward end connected to the upper, central part of said blade, and which also includes a spring with forward end within said barrel and connected upwardly thereto, and with rearward end connected to the forward part of said trigger between said trigger axle and said linkage, whereby, upon trigger release the respective springs draw blade and trigger further into said barrel as said linkage pivots accordingly, when said knife is not in use.

8. A knife as claimed in claim 1 which additionally includes a spring with forward end connected within, and upwardly to the underside of the forward, upper end of said barrel, and with the rearward end connected to the upper, central part of said blade, which also includes a spring with forward end within said barrel and connected upwardly thereto, and with rearward end connected to the forward part of said trigger between said trigger axle and said linkage, and in which the linkage rear pivot operates in a J-slot in said trigger, whereby, upon linkage removal from J-slot, the forward spring draws blade and linkage into the barrel and the rear spring draws the trigger further into the barrel thereafter, when said knife is not in use.

9. A knife as claimed in claim 1 which additionally has a spring with forward end within said barrel and connected upwardly thereto, and with rearward end connected to the forward part of said trigger between trigger axle and said linkage, said linkage rear pivot operating in a J-slot provided in said trigger, whereby said linkage may be released therefrom so that said spring may draw blade into said barrel and linkage thereafter, and said trigger may be disposed further in said barrel after said linkage.

10. A knife as claimed in claim 1 in which said blade cutting edge comprises arcuate serrations formed along one side as the cutting edge, the opposite side having concentric serrations spaced slightly thereabove with the edge surface between serration apices being ground arcuately, so that each serration comprises a tooth arcuately generated longitudinally and tapered from backing edge to cutting edge.

References Cited

UNITED STATES PATENTS

| | | | |
|---|---|---|---|
| 57,918 | 9/1866 | Jennings | 30—148 |
| 546,376 | 9/1895 | Barry et al. | 30—148 |

FOREIGN PATENTS

| | | |
|---|---|---|
| 75,136 | 1/1919 | Austria. |
| 727,531 | 11/1942 | Germany. |

MYRON C. KRUSE, *Primary Examiner.*